United States Patent
Kazawa et al.

(10) Patent No.: US 8,184,977 B2
(45) Date of Patent: *May 22, 2012

(54) OPTICAL LINE TERMINAL CAPABLE OF ACTIVE BANDWIDTH ALLOCATION FOR PASSIVE OPTICAL NETWORK SYSTEM

(75) Inventors: Tohru Kazawa, Kokubunji (JP); Kenichi Sakamoto, Kokubunji (JP); Ryosuke Nishino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 74 days.

This patent is subject to a terminal disclaimer.

(21) Appl. No.: 12/979,871

(22) Filed: Dec. 28, 2010

(65) Prior Publication Data

US 2011/0091211 A1 Apr. 21, 2011

Related U.S. Application Data

(63) Continuation of application No. 11/829,488, filed on Jul. 27, 2007, now Pat. No. 7,889,990.

(30) Foreign Application Priority Data

May 9, 2007 (JP) ................................ 2007-124079

(51) Int. Cl.
*H04J 14/00* (2006.01)

(52) U.S. Cl. ............... 398/72; 398/68; 398/69; 398/98; 398/100; 398/58; 370/468; 370/395.41; 370/442; 370/235

(58) Field of Classification Search ............. 398/66–72, 398/98–100, 58, 59, 73, 74, 75, 76, 77, 78, 398/79, 63, 25; 370/468, 442, 395.41, 389, 370/392, 395.3, 395.2, 235, 465, 395.4, 230, 370/390, 464

See application file for complete search history.

(56) References Cited

U.S. PATENT DOCUMENTS

| | | | |
|---|---|---|---|
| 7,362,975 B2 | 4/2008 | Choi et al. | |
| 7,564,852 B2 | 7/2009 | Das et al. | |
| 7,620,325 B2 | 11/2009 | Mizutani et al. | |
| 2003/0048805 A1 | 3/2003 | Yoshihara et al. | |
| 2007/0064731 A1 | 3/2007 | Mizutani et al. | |
| 2009/0180491 A1* | 7/2009 | Sala et al. ...................... | 370/442 |
| 2009/0269072 A1* | 10/2009 | Liaw et al. ...................... | 398/98 |

FOREIGN PATENT DOCUMENTS

| | | |
|---|---|---|
| CN | 1929361 A | 3/2007 |
| JP | 2003-087282 | 3/2003 |

(Continued)

OTHER PUBLICATIONS

"Series G: Transmission Systems and Media, Digital Systems and Network," International Telecommunication Union, G.984.1, Mar. 2003, pp. 1-14.

(Continued)

*Primary Examiner* — Hanh Phan
(74) *Attorney, Agent, or Firm* — McDermott Will & Emery LLP

(57) ABSTRACT

In a GPON system conforming to ITU-T Recommendations G.984.3, an optical line terminal is provided which has an active bandwidth allocation function that preferentially puts small bandwidth signals in a particular segment of a frame, e.g., at a head of the frame, to prevent fragmentations that may occur particularly when allocating small bandwidths of about 100 kbits/s.

4 Claims, 16 Drawing Sheets

FOREIGN PATENT DOCUMENTS

| | | |
|---|---|---|
| JP | 2005-538645 | 12/2005 |
| JP | 2007-074234 | 3/2007 |
| WO | WO 2004/025903 A2 | 3/2004 |

OTHER PUBLICATIONS

"Series G: Transmission Systems and Media, Digital Systems and Networks,"International Telecommunication Union, G.984.2, Mar. 2003, pp. 1-29.

"Series G: Transmission Systems and Media, Digital Systems and Networks," International Telecommunication Union, G.984.3, Feb. 2004, pp. 1-107.

"Series G: Transmission Systems and Media, Digital Systems and Networks," International Telecommunication Union, G.983.4, Jan. 2005, p. 1.

Japanese Office Action, with partial English translation, issued in Japanese Patent Application No. 2007-124079, mailed Jul. 28, 2009.

Chinese Office Action with partial English translation thereof, issued in Chinese Patent Application No. 2010083000403120, mailed on Sep. 2, 2010.

Entire Prosecution of U.S. Appl. No. 11/829,488 to Kazawa, et al., filed on Jul. 27, 2007, entitled "Optical Line Terminal capable of active bandwith allocation for passive optical network system".

* cited by examiner

FIG. 9

ALLOCATED BYTE LENGTH TABLE

| ONU-ID | BYTE LENGTH (BYTES) | ALLOCATION ORDER |
|---|---|---|
| 1 | 50 | 2 |
| 2 | 63000 | 3 |
| 3 | 25 | 1 |

TRANSMISSION TIMING TABLE

| | ONU-ID | START (BYTE) | END (BYTE) |
|---|---|---|---|
| 1ST PERIOD | 3 | 12 | 37 |
| | 1 | 49 | 39 |
| | 2 | 111 | 19440 |
| 2ND PERIOD | 2 | 12 | 19440 |
| 3RD PERIOD | 2 | 12 | 19440 |
| 4TH PERIOD | 2 | 12 | 4827 |

TRANSMISSION TIMING TABLE (ANOTHER CONFIGURATION) — 803

1ST PERIOD — 1101

| ONU-ID | START (BYTE) | END (BYTE) |
|---|---|---|
| 3 | 12 | 37 |
| 1 | 49 | 99 |
| 2 | 111 | 19440 |

2ND PERIOD — 1102

| ONU-ID | START (BYTE) | END (BYTE) |
|---|---|---|
| 1 | — | — |
| 2 | 12 | 19440 |
| 3 | — | — |

3RD PERIOD — 1103

| ONU-ID | START (BYTE) | END (BYTE) |
|---|---|---|
| 1 | — | — |
| 2 | 12 | 19440 |
| 3 | — | — |

4TH PERIOD — 1104

| ONU-ID | START (BYTE) | END (BYTE) |
|---|---|---|
| 1 | — | — |
| 2 | 12 | 4827 |
| 3 | — | — |

FIG. 15

TRANSMISSION TIMING TABLE
(EMBODIMENT 2)

|  | ONU-ID | START (BYTE) | END (BYTE) |
|---|---|---|---|
| 1ST PERIOD | 3 | 12 | 37 |
| 2ND PERIOD | 1 | 12 | 62 |
| 3RD PERIOD | 2 | 12 | 19440 |
| 4TH PERIOD | 2 | 12 | 19440 |

1501 1502 1503

1500

OPTICAL LINE TERMINAL CAPABLE OF ACTIVE BANDWIDTH ALLOCATION FOR PASSIVE OPTICAL NETWORK SYSTEM

INCORPORATION BY REFERENCE

The present application is a Continuation of U.S. patent application Ser. No. 11/829,488, filed on Jul. 27, 2007, now U.S. Pat. No. 7,889,990, and claims priority from Japanese application JP 2007-124079 filed on May 9, 2007, the entire contents of each of which are hereby incorporated by reference into this application.

BACKGROUND OF THE INVENTION

The present invention relates to a PON (Passive Optical Network) system in which a plurality of subscribers' devices share optical transmission lines.

The PON generally comprises one OLT (Optical Line Terminal) and a plurality of ONUs (Optical Network Units) and transforms signals from terminals such as PCs (Personal Computers) connected to ONUs into optical signals before sending them to the OLT via optical fibers. The optical fibers from the plurality of ONUs are connected together by an optical splitter which optically multiplexes (time-division multiplexes) the optical signals and sends them to the OLT.

The length of optical fibers between ONUs and OLT is specified by Chapter 8 and 9 in ITU-T Recommendations G.984.1 to be in the range of, for example, 0-20 km, 20-40 km or 40-60 km, and each ONU is installed at any desired distance from the OLT within the above ranges. Therefore, transmission delays of optical signals between OLT and respective ONUs differ depending on the length of optical fiber. Without considering the transmission delays, there is a possibility of the optical signals output from ONUs colliding or interfering with one another when they are optically multiplexed by the optical splitter.

To deal with this problem, the OLT uses a ranging method as defined in Chapter 10 in ITU-T Recommendations G.984.3 to adjust the delays of output signals from ONUs to make the respective ONUs appear to be located at equal distances, for instance 20 km, from the OLT in order to prevent the optical signals from ONUs from interfering with one another. Further, to allocate a communication band of one optical fiber to as many ONUs as possible according to user requests, a DBA (Dynamic Bandwidth Allocation) method whereby the OLT allocates an upstream bandwidth for each ONU (data transmission position/time) is also defined in ITU-T Recommendations G.983.4. A transmission band control based on this method is also being practiced.

For example, according to the specifications of Chapter 8.2 of ITU-T Recommendations G.984.3, signals transmitted from a plurality of ONUs to the OLT are called upstream signals and comprised of a preamble, a delimiter and a payload signal. As shown in FIG. 8-2 of Chapter 8 of the same recommendations, a guard time is set immediately before the upstream signal to avoid a possible collision with a preceding burst signal. According to the specifications of Chapter 8.1 of the same recommendations, signals sent from the OLT to the plurality of ONUs are called downstream signals and comprised of a frame synchronization pattern, a PLOAM area, a US Bandwidth MAP area and a frame payload.

As shown in Chapter 8.1.3.6 of the same recommendations, an area called a US Bandwidth MAP is used to specify a send permission timing for the upstream signal from each ONU. The US Bandwidth MAP area has a Start value representing a start of the send permission timing and an End value representing an end of that timing, both specified in bytes. These values are also called grant values as they permit the transmission. A difference between the End value and the next Start value is an area where there is no upstream signal, and corresponds to the guard time. Each ONU can be assigned a plurality of bandwidth allocation units called T-CONT and the send permission timing for the upstream signal is specified for each T-CONT.

SUMMARY OF THE INVENTION

The above ITU-T Recommendations G.984.3 specifies that grants for the associated ONUs should be sent at one time near the head of a 125-microsecond frame that constitutes a downstream signal. In other words, the OLT must send the grant to each ONU at 125-microsend intervals. Each ONU therefore must share the transmission lines with other ONUs in a time-division manner in a 125-microsecond cycle.

At this time, if the OLT executes the DBA processing at 125-microsecond intervals, it can reflect the band allocated to each ONU on the Start value and the End value as is and send the grant signal. However, the OLT does not necessarily perform the DBA processing at such short intervals as 125 microseconds but actually executes DBA processing at longer intervals than the grant cycle, for example at intervals of 0.5 millisecond or 1.0 millisecond.

As described above, during the DBA processing, the OLT allocates for each ONU a data length in excess of that which can be accommodated in the 125-microsecond grant period. So, at the stage of giving the grant, the OLT performs extra processing in which it divides the data length determined by the DBA processing into a plurality of frames each 125 microseconds long and in each 125-microsecond frame specifies the Start value and the End value.

When the OLT divides the data length that it granted to one ONU by the DBA processing into a plurality of 125-microsecond frames, the divided grant frames are each attached with a header. The data length that the OLT allocated to each ONU during the DBA processing incorporates only one header that is always added initially. Therefore, if the grant frame is divided, the data length that the ONU can actually send with the divided frames decreases by the extra header attached from that the ONU is initially allowed to send.

For example, let us consider a case where a certain ONU requires a 256-kbit/s upstream bandwidth for VoIP. Suppose the OLT is executing a bandwidth allocation computation (DBA processing) at 0.5 millisecond intervals. Then the 256-kbits/s band, when calculated for 0.5 millisecond, is equivalent to (256,000×0.0005)/8=16 (bytes). In G-PON, a method is defined which accommodates signals in a variable-length packet called GEM for transmission. According to ITU-T Recommendations G.984.3, an encapsulation is performed which attaches a length of the variable-length frame and a flow label to a 5-byte header called a GEM header. The OLT considers the one GEM header that is always added initially in granting a send permission for the data length of 16+5=21 (bytes) during the DBA processing.

Suppose the speed of upstream signal from ONU to OLT is 1.244 Gbits/s. Then, the data length that can be transmitted in a 125-microsecond duration, the grant cycle, is (12,000,000,000×0.000125)/8≈19,440 (bytes). The 21-byte data length can be accommodated in the data length of 19,440 bytes, which is one grant period. If unfortunately the 21-byte data length should be arranged at a border of the grant period, it is fragmented into two grant frames. Suppose, for example, the data length is divided into two grant frames—a grant frame of a 5-byte header and a 10-byte payload and a grant frame of a 5-byte header and 1-byte payload. Although the total data length for the entire frames is the granted 21 bytes, the total payload is 11 bytes, far less than the 16 bytes required to maintain the 256-kbits/s band, which means that about 31% of the data is left untransmitted, greatly affecting the communication quality.

An object of this invention is to provide OLT, ONU and PON systems that can prevent fragmentations during a bandwidth allocation for small data lengths used in those services, such as VoIP data transmission, whose quality of service is greatly degraded by delays.

This invention overcomes the above problem by preferentially arranging signals of small bandwidth in a specific segment of a frame, for example, in a head area of the frame.

In a G-PON system conforming to G.984.3, particularly when allocating a small bands of about 100 kbits/s, the communication quality can be prevented from being degraded by fragmentations.

Other objects, features and advantages of the invention will become apparent from the following description of the embodiments of the invention taken in conjunction with the accompanying drawings.

BRIEF DESCRIPTION OF THE DRAWINGS

FIG. 9 illustrates one embodiment of an allocated byte length table.

FIG. 10 illustrates one embodiment of a transmission timing table.

FIG. 11 illustrates another embodiment of a transmission timing table.

FIG. 15 illustrates an example transmission timing table according to embodiment 2.

DETAILED DESCRIPTION OF THE INVENTION

Now, embodiments of this invention will be described.
[Embodiment 1]

Figure 1:
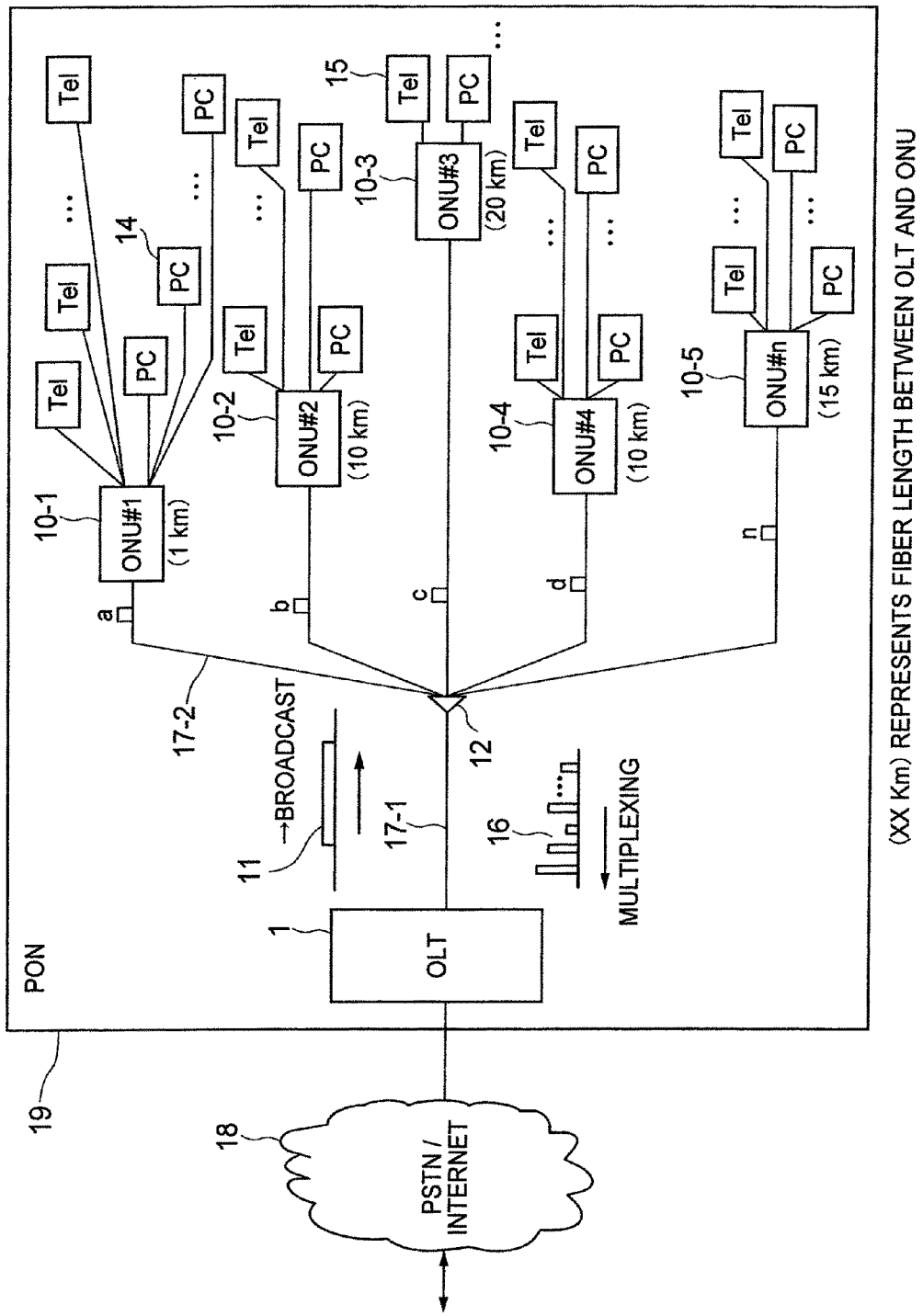
FIG. 1 illustrates an example configuration of an optical access network.

FIG. 1 shows an example configuration of an optical access network that applies the present invention. The PON 19 comprises a coupler module 12 such as an optical splitter/optical coupler, OLT 1 or optical line terminal installed in a carrier's office building, a trunk fiber 17-1 connecting OLT 1 and the optical splitter, a plurality of ONUs 10 or optical network units as subscriber side devices installed in subscribers' homes or their vicinity, and a plurality of branch fibers 17-2 connecting the ONUs 10 to the coupler module 12. The OLT 1 can be connected, for example, to 32 ONUs 10 through the trunk fiber 17-1, coupler module 12 and branch fibers 17-2. Each of the ONUs 10 is connected with user terminals such as telephones 15 and personal computers 14. The PON 19 is connected to PSTN (Public Switched Telephone Networks) and Internet 18 through OLT 1 so that it can send and receive data to and from these higher level networks.

FIG. 1 shows five ONUs 10. A downstream signal 11 transmitted from OLT 1 to ONUs 10 has signals to the respective ONUs 10 tiime-division multiplexed. Each ONU 10, upon receiving the signal 11, checks whether the signal is addressed to itself. If so, the ONU 10 distributes the signal to the telephone 15 or personal computer 14 according to the destination of the signal.

In the upstream direction from the ONUs 10 to the OLT 1, a signal a transmitted from ONU 10-1, a signal b transmitted from ONU 10-2, a signal c transmitted from ONU 10-3, a signal d transmitted from ONU 10-4 and a signal n transmitted from ONU 10-*n* are time-division multiplexed by the coupler module 12 into a signal 16 that reaches OLT 1. That is, since the OLT 1 already knows from which ONU 10 the signal will be received at what timing, it can identify the signal from any ONU 10 according to the timing of reception and performs the corresponding processing.

Figure 2:
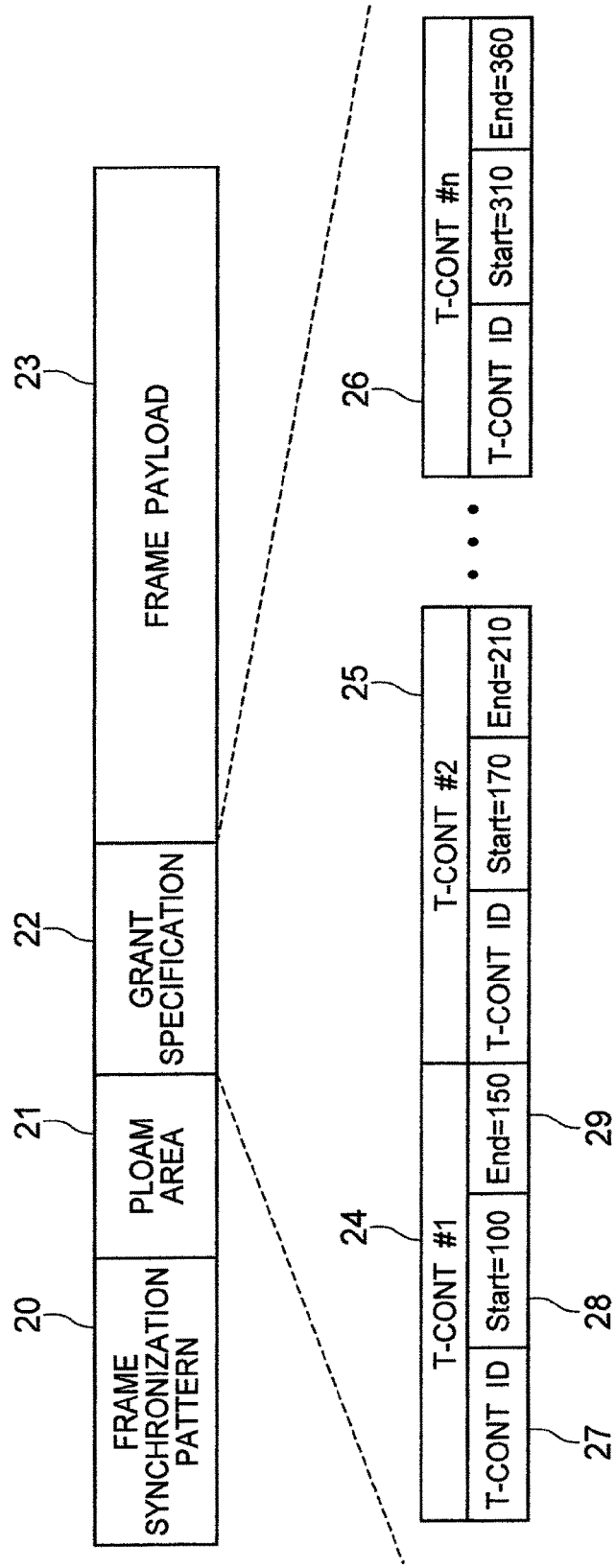
FIG. 2 illustrates an example of a downstream PON signal frame.

FIG. 2 shows an example of a downstream PON signal frame transmitted from OLT 1 to each ONU 10. The downstream frame is comprised of a frame synchronization pattern 20, a PLOAM area 21, a grant specification area 22, and a frame payload 23. The frame payload 23 accommodates a user signal to be transmitted from OLT 1 to ONU 10 and its detail is specified in ITU-T Recommendations G.984.3. The grant specification area 22 comprises a T-CONT#1 signal 24 to control ONU 10-1, a T-CONT#2 signal 25 to control ONU 10-2 and a T-CONT#n signal 26 to control ONU 10-*n*. Further, the T-CONT#1 signal 24 comprises a T-CONT ID area 27, a Start value 28 and an End value 29.

The T-CONT (Trail CONTainer) represents a bandwidth assignment unit in the DBA. If, for example, ONU 10 has a plurality of sending buffers, these buffers may each be attached with a T-CONT ID, identity information of T-CONT, so that OLT 1 can control each of the buffers. The following embodiment explains a case where one ONU has one T-CONT (buffer), i.e., there is a one-to-one relation between ONU-ID and T-CONT ID. It is also noted that this invention can also be applied similarly to a case where one ONU has a plurality of T-CONTs. In that case, the relation between the ONU-ID which identifies ONU and the T-CONT ID can be managed by generating a table indicating which T-CONT ID is included in each ONU-ID.

The Start value 28 indicates a timing at which to allow the sending of an optical signal to each ONU to be started. The End value 29 indicates a timing at which the send permission is to be terminated. The Start value 28 and the End value 29 are specified in bytes. The OLT 1 cyclically sends to each ONU 10 a message, including the grant specification 22, which allows the transmission of upstream data, and thereby specifies how much of the upstream bandwidth should be used by each ONU. The Start value 28 and the End value 29 are information that indicates at which timing in each cycle of grant specification transmission the sending of data should be started and ended. The OLT may specify to ONU the length of data to be transmitted instead of the End value and tell the ONU to send, from the timing of the Start value, as much data as specified by the length.

Figure 3:
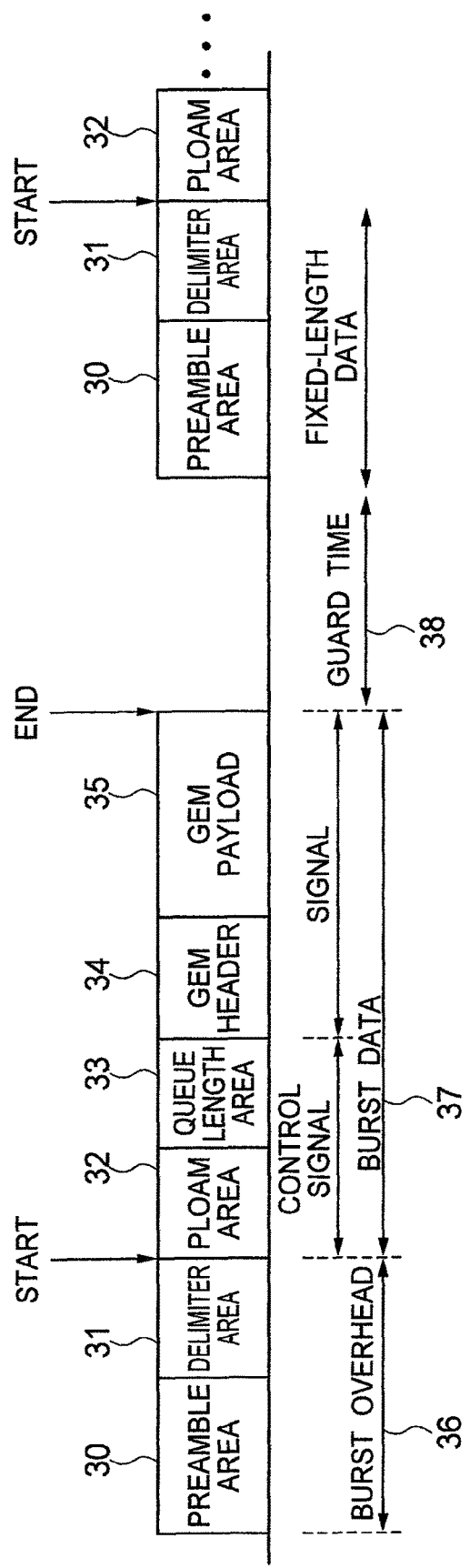
FIG. 3 illustrates an example of an upstream PON signal frame.

FIG. 3 shows an example of an upstream PON signal frame transmitted from ONU 10 to OLT 1. The PON signal is comprised of a preamble area 30, a delimiter area 31, a PLOAM area 32, a queue length area 33 and a frame payload 35. The Start value 28 indicates a start position of the PLOAM area 32, i.e., a start position of burst data 37. The End value 29 indicates an end position of the frame payload 35. A guard time 38 in ITU-T Recommendations G.984.3 represents a time from the end position (End value) of the frame payload 34 of an upstream signal to the start position of the preamble area 30 of the next upstream signal. As described above, since there are the guard time 38, the preamble area 30 and the delimiter area 31 between the data positions indicated by the Start value and the End value, a space of several bytes is created between the preceding End value and the next Start value.

Figure 4:
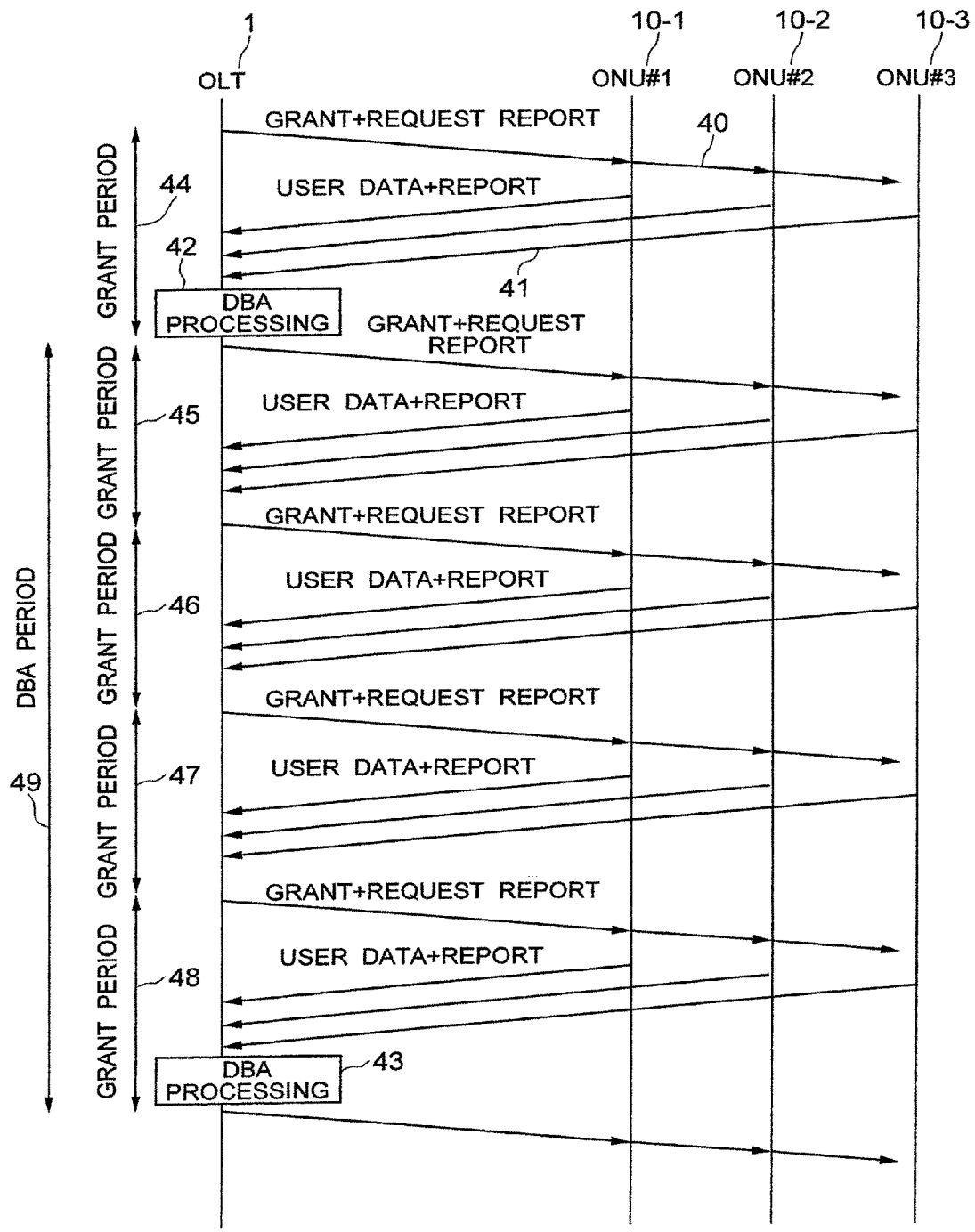
FIG. 4 illustrates an example sequence of DBA processing.

FIG. 4 shows a sequence of processing that determines and notifies the Start value 28 and the End value 29. The OLT 1 transmits a send permission message 40 including the grant specification 22 to ONUs 10-1 to 10-3. This send permission message 40 also includes information that requests reporting how much untransmitted data remains in a transmission queue of each ONU 10. Each of ONUs 10-1 to 10-3 sends data remaining in the transmission queue by using a time slot specified by the Start value 28 and End value 29 of the grant specification 22 and at the same time sends the information about how much data remains in the transmission queue to the OLT 1 by using the queue length area 33 in an upstream message 41.

The OLT 1 performs DBA processing 42 that determines, from information about untransmitted data volume reported from ONUs 10-1, how much data each ONU 10 should be allowed to transmit. If, in addition to the information about the untransmitted data volume for each ONU 10-1 to 10-3, there is other information, such as bandwidth parameters that are guaranteed to be assigned to each ONU, the DBA processing 42 uses such various other information to determine the amount of data that each ONU is allowed to send next time.

In FIG. 4 the OLT 1 does not execute the DBA processing in every grant period 45-48 but execute the DBA processing once for a plurality of grant periods. Therefore, the OLT 1 uses an untransmitted data volume report 41 received immediately before to determine, in one DBA processing, the Start value 28 and End value 29 for each ONU in a plurality of grant periods. In the following explanation, this embodiment takes up an example case where the DBA period is 0.5 ms and the grant period is 125 μs. It is noted that the DBA period and the grant period may take other values.

Figure 5:
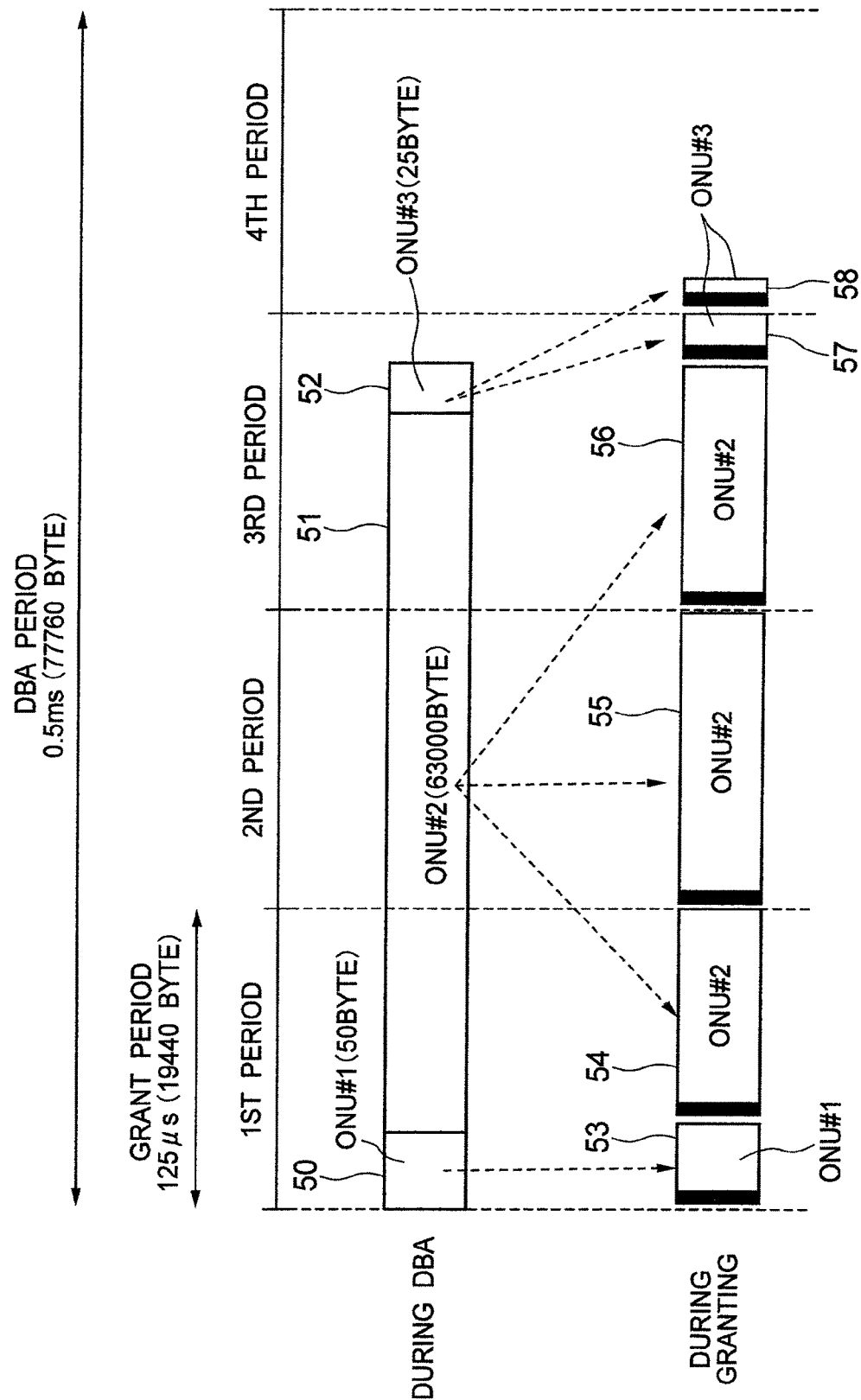
FIG. 5 is an explanatory diagram showing how a fragmentation occurs during the process of granting.

FIG. 5 shows how data is transmitted from ONU#1 to #3 in four grant periods included in the DBA period of, say, 0.5 ms during which the DBA processing is executed. If the DBA period is 0.5 ms, it includes four grant periods of 125 μs. Suppose the upstream signal rate is about 1.2 Gbits/s. Then, the data length that can be transmitted during the DBA period of 0.5 ms is 77,760 bytes and the data length that can be transmitted during one grant period of 125 μs is 19,440 bytes.

The OLT 1 has determined, during the period of 0.5 ms, a send permission that allows ONU#1 to send 50 bytes of data 50, ONU#2 to send 63,000 bytes of data 51 and ONU#3 to send 25 bytes of data 52. However, since the grant period is 125 μs, the OLT 1 must specify the data transmission timing every 19,440 bytes to each ONU#1 to #3. Suppose that the send permission is given in the order of the ONU number.

Then, the OLT 1 gives ONU#1 a send permission for data 53 in the first grant period, and gives ONU#2 a send permission for data 54 in the rest of the first period, a send permission for data 55 in all the second period and a send permission for data 56 in a part of the third period. Then, the OLT 1 gives ONU#3 a send permission for data 57 in the rest of the third grant period and a send permission for data 58 in a part of the fourth period.

In the example shown, a phenomenon called fragmentation has occurred in which data of ONU#2 and ONU#3 crosses the boundary of the grand period and is thus fragmented into a plurality of pieces of data. Take the ONU#2 data for example. During the DBA processing, this data is data 51. But during the granting, it is divided into three pieces of data 54, 55, 56 and transmitted from ONU#2. Similarly, the ONU#3 data is data 52 during DBA but, in the granting, is divided into two pieces of data 57 and 58. When the data is divided, each piece of data is attached with a GEM header, which is 5 bytes long. Referring to FIG. 5, of the divided ONU#3 data 57, 58, black-painted portions at the head of data correspond to GEM headers 34 in FIG. 3 and blank portions to the GEM payloads 35 in FIG. 3. If the PLOAM area 32 and the queue length area 33 are also attached to the GEM payload as shown in FIG. 3, the amount of data that can be transmitted is more limited than when only 5 bytes of GEM header 34 is attached.

In assigning each ONU with a data length that the ONU is allowed to send, the OLT 1 considers the fact that one GEM header is attached to the head of data. However, the OLT 1 does not consider the data fragmentation. Therefore, if ONU#3 reports 20 bytes of untransmitted data, the OLT 1 gives a send permission that allows ONU#3 to send a total of 25 bytes of data, which is 5 bytes of header added to the 20 bytes of untransmitted data. As shown in FIG. 5, should a fragmentation occur, ONU#3 cannot send 5 bytes of data that is used for the GEM header and thus can only send 15 bytes of data, which is two GEM headers less than the permitted data length of 25 bytes, when 20 bytes of data needs to be transmitted.

The 5 bytes that should have been transmitted during this DBA period will be transmitted in the next DBA period. In this example, the DBA period is 0.5 ms. If the DBA period is longer, the delay of data transmission will become larger. The same is true of ONU#2. However, since the permitted data length for ONU#2 is as large as 63,000 bytes, there is little adverse effect if data of about 10 bytes fails to be transmitted because of the GEM header. For ONU#3, on the other hand, 5 bytes represents 25% of all data of 20 bytes and its failure to be transmitted has a significant influence.

For this reason, in this embodiment the OLT 1 changes the order in which to give the send permission to ONUs so that an ONU having a small byte length allocated by the OLT 1 in the DBA processing will not be given a send permission for data that spreads over the boundary of grant periods.

Figure 6:
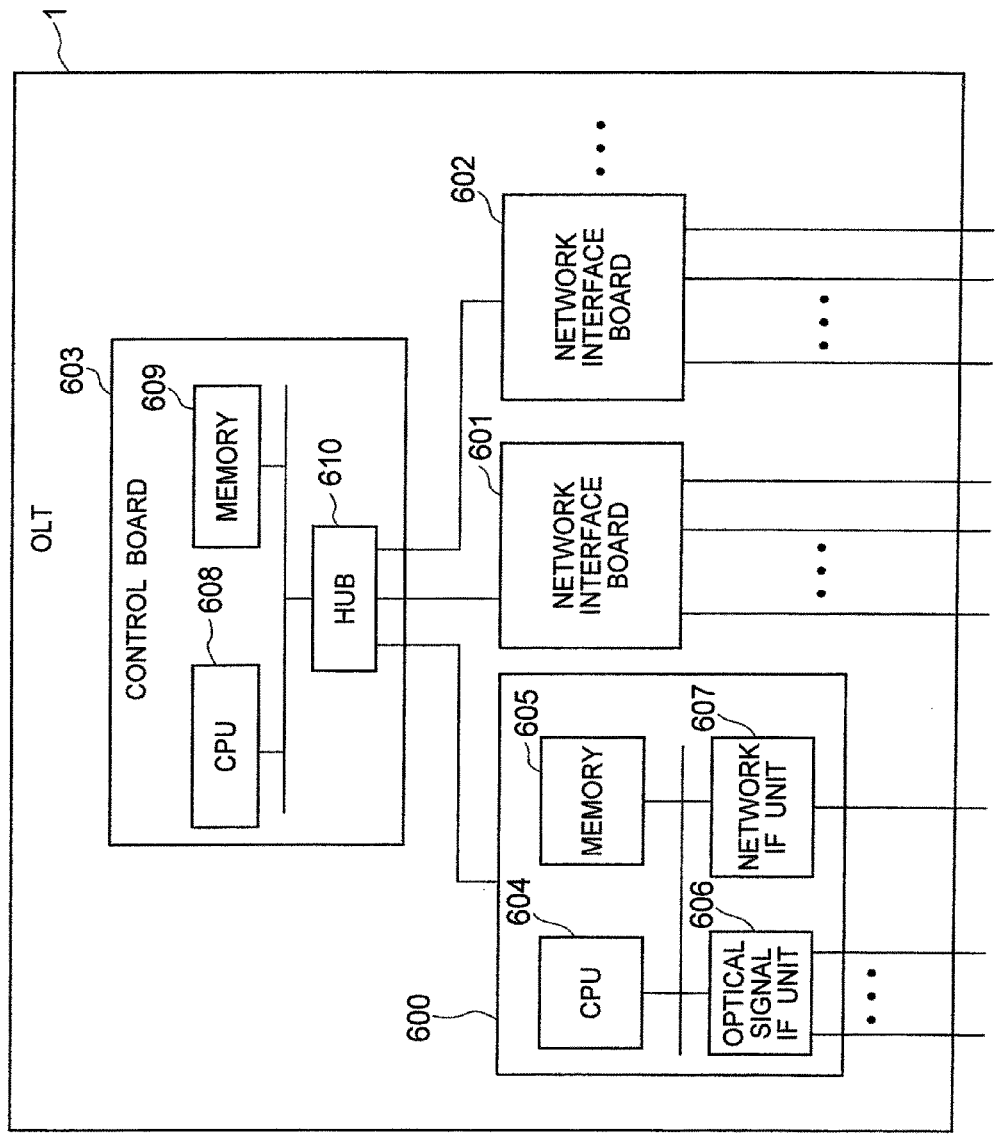
FIG. 6 illustrates one embodiment of an OLT hardware configuration.

FIG. 6 shows an example hardware configuration of OLT. OLT 1 has a control board 603 for managing the operation of the device as a whole and a plurality of network interface boards 600, 601, 602 connected to the network for transmission and reception of signals. The control board 603 has a memory 609 and a CPU 608 and controls the network interface boards through a HUB 610. Each of the network interface board has an optical signal interface unit 606 for transferring optical signals to and from ONUs, a network interface unit 607 for transferring signals to and from a higher level network such as Internet, and a CPU 604 and a memory 605 for executing processing required to transfer signals to and from ONUs and higher level networks. Various kinds of functions in this embodiment are invoked by the CPU 604 executing programs stored in the memory 605. Alternatively, application specific hardware (e.g., LSI) may be prepared to execute the required processing. The hardware configuration of OLT 1 is not limited to the above and various modifications may be made as required.

Figure 7:
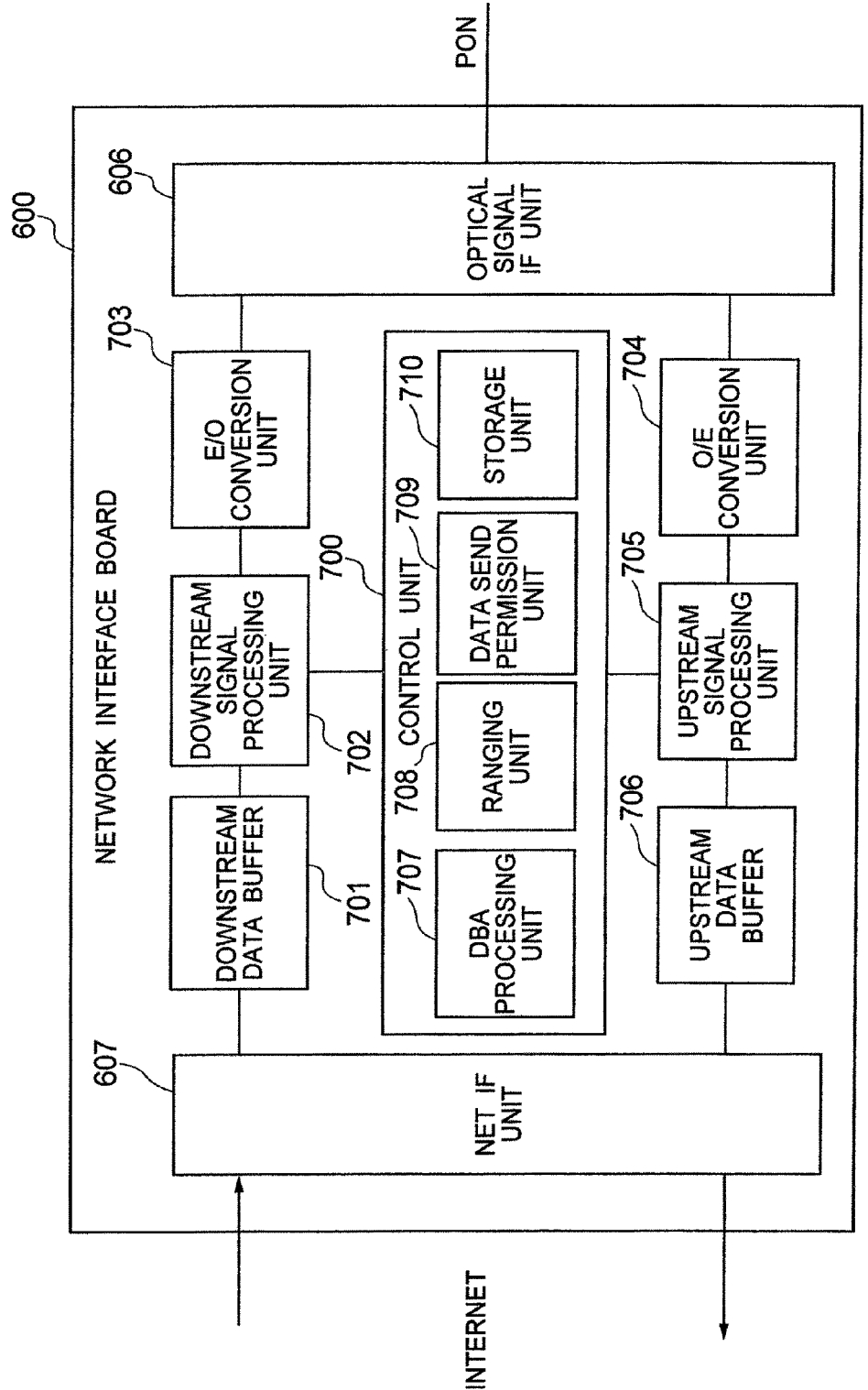
FIG. 7 illustrates an embodiment showing a detailed hardware configuration of an OLT.

FIG. 7 shows an example configuration of the network interface board 600. A downstream data buffer 701 temporarily accumulates data received from a higher level network 18. A downstream signal processing unit 702 performs processing necessary to relay optical signals from the higher level network 18 to PON 19. An E/O conversion unit 703 converts electric signals from the higher level network 18 into optical signals. An E/O conversion unit 704 converts optical signals received from PON 19 into electric signals. An upstream signal processing unit 705 performs processing necessary to relay signals from PON 19 to the higher level network 18. An upstream data buffer 706 temporarily accumulates data to be transmitted to the higher level network 18.

A control unit 700 has functions to execute various kinds of processing to communicate with a plurality of ONUs 10. A DBA processing unit 707 performs a dynamic bandwidth assignment which determines how much bandwidth should be allocated to each of a plurality of ONUs 10 in each predetermined DBA period. The bandwidth shows how much byte length out of the total byte length that can be transmitted in one DBA period is allocated to each ONU 10. A ranging unit 708 sends a ranging signal to each ONU prior to the data transmission and reception to and from the ONUs and measures the time it takes to receive a response to the ranging signal. Based on the response time the ranging unit 708 calculates the distance between the OLT 1 and each ONU 10 and determines the transmission delay times. The OLT 1 notifies each ONU 10 of the transmission delay time and the ONUs 10 send data at a timing which is the notified transmission delay time added to the data transmission timing permitted by the OLT 1. A data send permission unit 709, based on the byte length for each ONU 10 determined by the DBA processing unit 707, determines in byte length a timing for each ONU to start data transmission and a timing to end the transmission. A storage unit 710 stores information necessary for the processing of the control unit 700.

Figure 8:
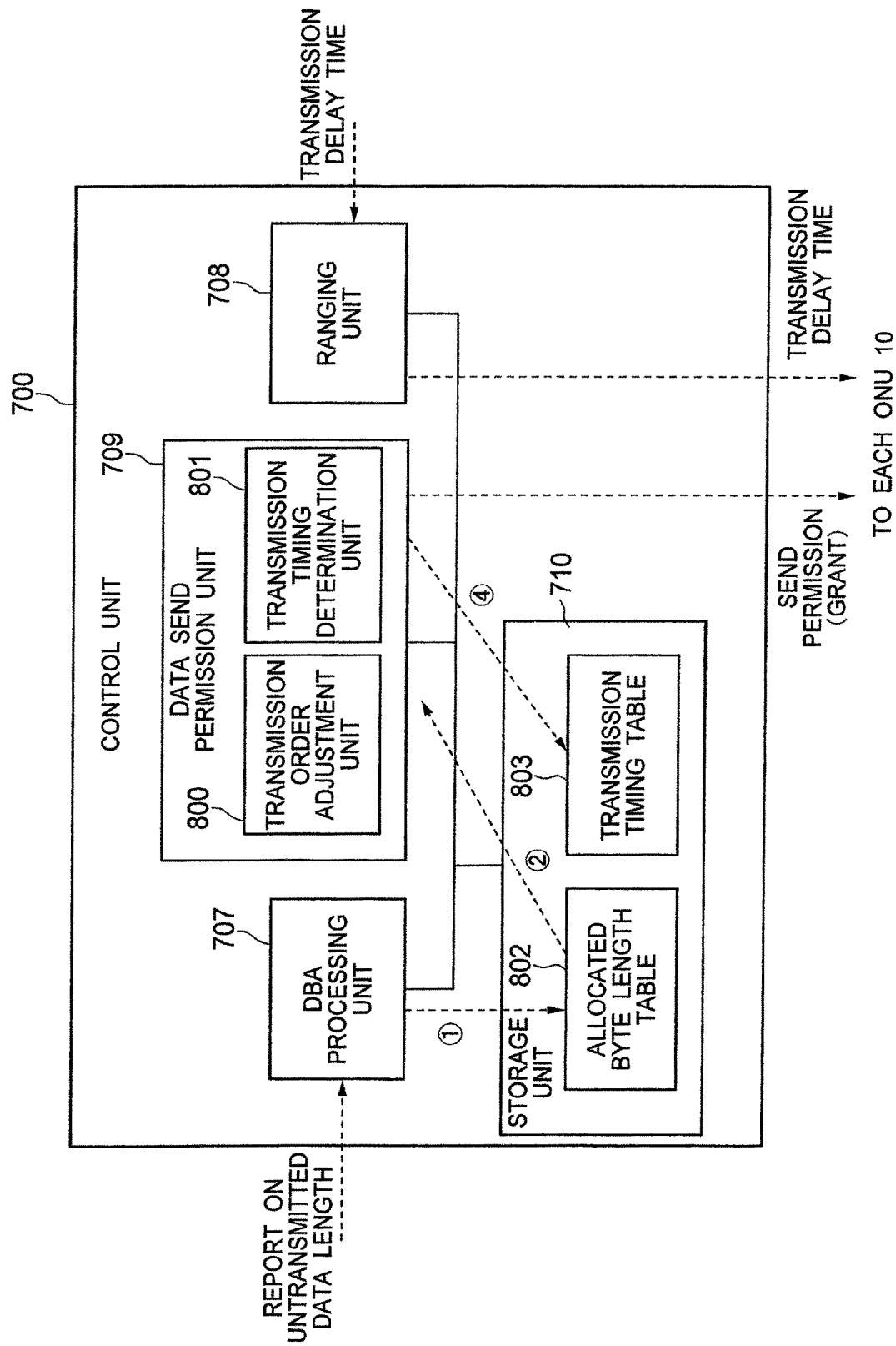
FIG. 8 is a functional block diagram of a control unit.

FIG. 8 shows details of the control unit 700. The DBA processing unit 707 receives from the queue length area 33 contained in the upstream signal a report on the untransmitted data volume held by each ONU 10. Based on the untransmitted data volume received and, in some cases, the bandwidth that is always allocated to each ONU 10, the DBA processing unit 707 determines in byte length a bandwidth to be allocated to each ONU 10 in every DBA period. The DBA processing unit 707 generates an allocated byte length table 802, that matches the ONU-ID identifying each ONU and the allocated byte length, and then stores the table in the storage unit 710.

FIG. 9 shows an example of the allocated byte length table 802. The allocated byte length table 802 has information about an ONU-ID 901, a byte length 902 assigned to each ONU, and an allocation order 903 specifying in what order the time slot is allocated to ONUs during the granting. After the DBA processing unit 707 has stored the byte length 902 associated with each ONU-ID 901 in memory, a sending order adjustment unit 800 of the data send permission unit 709 compares the byte lengths of the ONUs and in the allocation order 903 numbers the ONUs beginning with the one of the smallest byte length. As a result, in the example of FIG. 9, the time slot is assigned to ONU#3, ONU#1 and ONU#2 in that order.

After the allocated byte length table 802 has been generated, a transmission timing determination unit 801 of the data send permission unit 709 assigns a time slot to the byte length 902 of each ONU in each grant period to generate a transmission timing table 803, which is then stored in the storage unit 710.

FIG. 10 shows an example of the transmission timing table 803. The transmission timing table 803 has an ONU-ID 1001, a Start 1002 representing a data transmission start timing and an End 1003 representing a data transmission end timing. As shown in the transmission timing table 803, in the first grant period, the time slot is allocated to ONU#3, ONU#1 and ONU#2 in that order. For ONU#2, since not all data can be transmitted within the first period, the data is divided into the second, third and fourth period and the divided data is each assigned a time slot. All the transmission timings in the four grant periods are specified in the single transmission timing table 803. The boundary of the period lies where the previous ONU Start value 1002 is larger than the next ONU Start value 1002.

FIG. 11 shows another configuration of the transmission timing table 803. The transmission timing table 803 consists of a plurality of tables, one for each grant period—a first grant period table 1101, a second grant period table 1102, a third grant period table 1103, and a fourth grant period table 1104. The OLT 1 therefore may manage the transmission timing table 803 by dividing it into a plurality of tables.

The transmission timing determination unit 801 sends the send permission message including the grant specification 22 to each ONU 10, according to the generated transmission timing table 803, to notify them of the data transmission timings.

Figure 12:
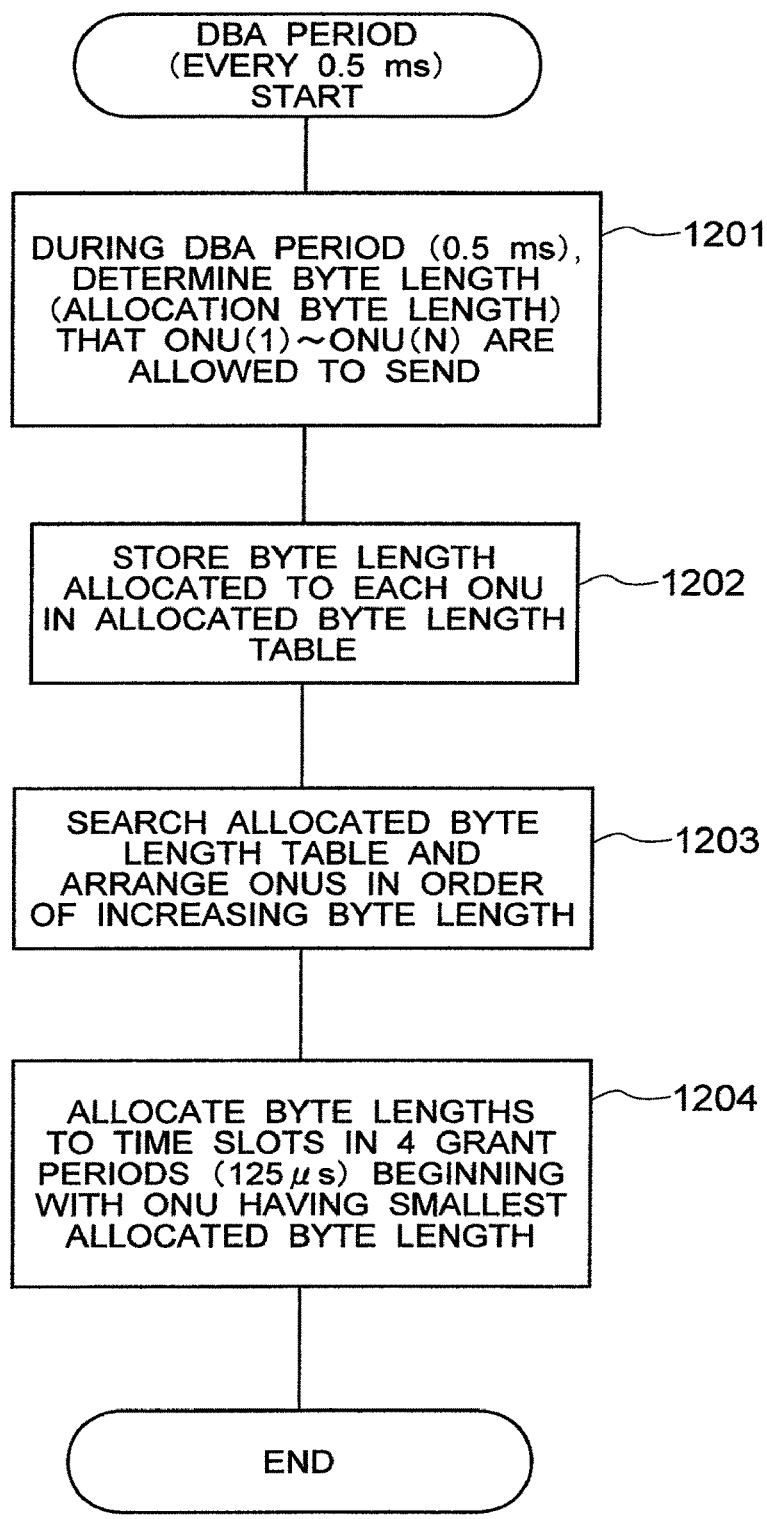
FIG. 12 illustrates one embodiment of a flow chart showing a sequence of steps executed by the control unit.

FIG. 12 shows an example flow chart of the processing executed by the control unit 700. First, the control unit 700 uses the report on untransmitted data volume from each ONU and information on a minimum usable bandwidth, if made available, to determine in byte length (1201) the data volume that each ONU is allowed to send in each DBA period of 0.5 ms. The control unit 700 then stores these information as the allocated byte length table 802 in the storage unit 710 (1202).

Next, the data send permission unit 709 references the byte length 902 of the allocated byte length table 802 and sorts the ONUs in the ascending order of byte length (1203). At this time, the sending order adjustment unit 800 may specify the allocation order according to the allocation order 903 in the allocated byte length table 802. Alternatively, the step of sorting the ONUs according to the byte length may be omitted and the next step 1204 may be executed as soon an ONU not yet assigned a time slot and having the smallest byte length 902 is found.

The data send permission unit 709, that has checked the magnitude of the byte length 902 allocated to each ONU by the DBA processing unit 707, allocates a time slot to each ONU in the ascending order of the byte length 902 by using a plurality of grant periods included in the DBA period (1204). Since in this embodiment the DBA period of 0.5 ms contains four grant periods of 125 μs, the data transmission timing is determined by using time slots for four grant periods.

Figure 13:
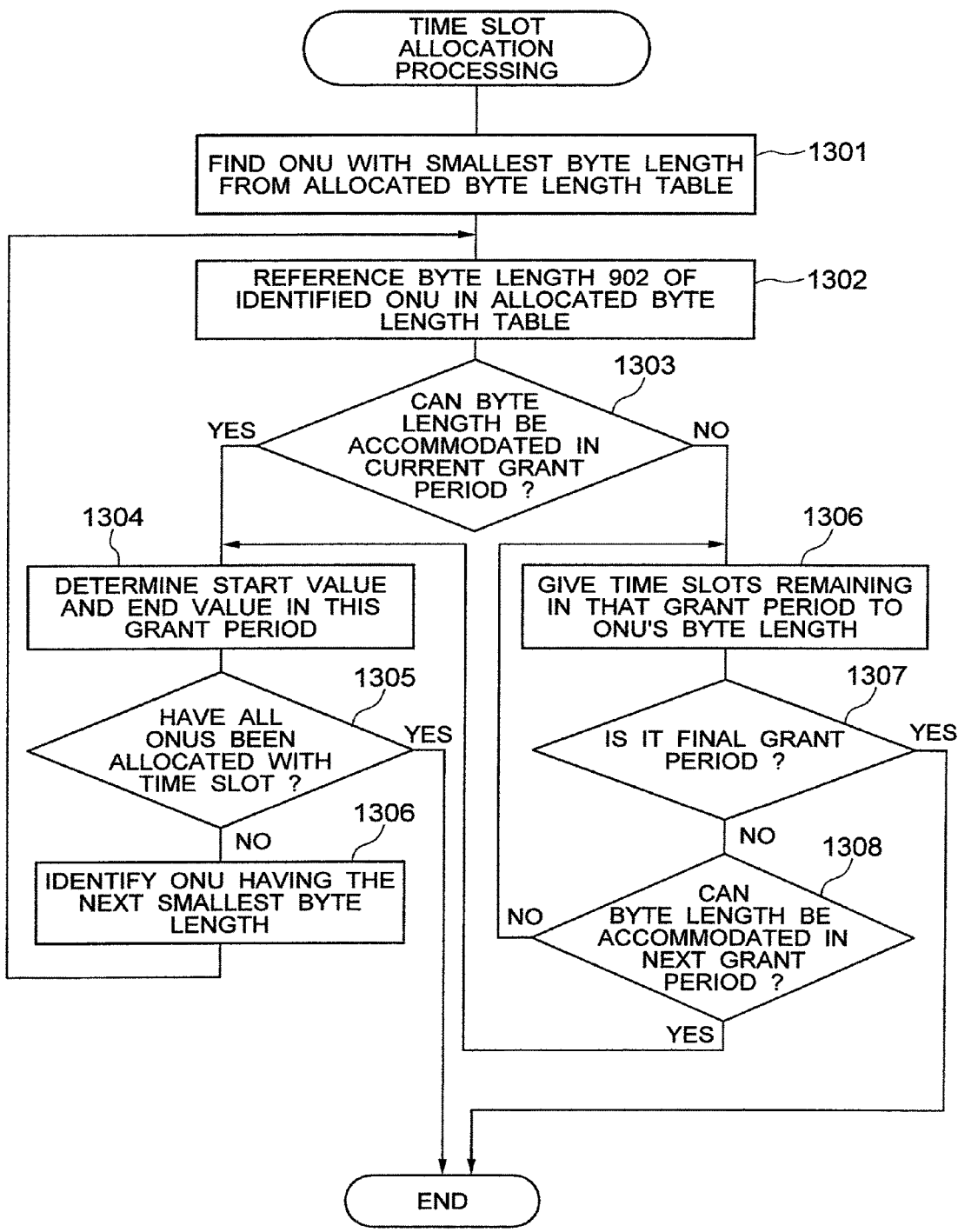
FIG. 13 illustrates one embodiment of a flow chart showing a sequence of steps executed by time slot allocation processing.

FIG. 13 shows more detailed processing of the step 1204 in the flow chart of FIG. 12. Here we will explain the process in which the transmission timing table 803 of FIG. 10 is generated by executing the processing of this flow chart on the allocated byte length table 802 of FIG. 9. The transmission timing determination unit 801 first refers to the allocated byte length table 802 and identifies ONU#3, whose ONU-ID 901 is 3, as the one having the smallest byte length 902 (1301). In identifying ONU#3, information about the allocation order 903 in the allocated byte length table 802 may be used.

Next, the transmission timing determination unit 801 references the byte length 902 of the identified ONU#3 (1302) and checks if the value of 25 bytes can be accommodated in the byte length of 19,440 bytes of the first period or the current grant period (1303). In that case, the data of ONU#3 can be accommodated in the first period, so the transmission timing determination unit 801 sets 12 bytes as the Start value of ONU#3 and 37 bytes as the End value in the first period (1304). The transmission timing determination unit 801 checks whether the time slots have been allocated to all ONUs (1305). Since the ONU#1 and ONU#2 have yet to be allocated with time slots, the process continues.

The data send permission unit 709 identifies, from among the remaining ONUs, ONU#1, whose ONU-ID 901 is 1, as the ONU having the smallest byte length 902 (1306), refers to the byte length 902 of ONU#1 (1302), and checks if the value of 50 bytes can be accommodated in the byte length of the first period or the current grant period (1303). At this time, in the first period ONU#3 is already using up to 37 bytes, which is the End value. So, a check is made as to whether the 50 bytes can be accommodated in 19,403 bytes, which is 37 bytes subtracted from 19,440 bytes.

In this case, since the data of ONU#1 can be accommodated in the first period, the Start value and the End value of ONU#1 in the first period are determined to be 49 bytes and 99 bytes, respectively (1304). As shown in FIG. 3, since the guard time, preamble area 30 and delimiter area 31 exist between the adjoining End value and Start value of the upstream signal, the transmission timing determination unit 801 puts an enough space between the End value of ONU#3 of 37 bytes and the Start value of ONU#1 to accommodate them and appropriately sets the Start value of ONU#1 to 49 bytes.

The transmission timing determination unit 801 confirms that ONU#2 has yet to be processed (1305, 1306), and then refers to the byte length 902 of ONU#2 in the allocated byte length table 802. The byte length of ONU#2 is 63,000 bytes and the remaining byte length in the first period or the current grant period is 19,341 bytes, which is obtained by subtracting the End value of ONU#1 of 99 bytes, which was allocated immediately before, from the 19,440 bytes. So, the transmission timing determination unit 801 determines that the data of ONU#2 cannot be accommodated in the first period (1303). At this time, the transmission timing determination unit 801 allocates all the remaining time slots of the first period to ONU#2 and sets the Start value and End value of ONU#2 in the first period to 111 bytes and 19,440 bytes, respectively (1306). At this point in time, the data length of ONU#2 that has yet to be allocated with time slot is 63,000−19,440+ 111=43,671 (bytes).

The transmission timing determination unit 801 confirms that the second and the subsequent period remain to be processed (1307), and then checks if the remaining 4,367 bytes of the byte length 902 of ONU#2 can be accommodated in the second period byte length of 19,440 bytes (1308). In this case, the remaining bytes cannot be accommodated, so the transmission timing determination unit 801 gives all time slots of the second period to ONU#2 and sets the Start value and End value of ONU#2 in the second period to 12 bytes and 19,440 bytes, respectively. At this point in time, the data length of ONU#2 that has yet to be allocated with time slot is 43,671− 19,440+12=24,243 (bytes).

Further, the transmission timing determination unit 801 confirms that the third period remains to be processed (1307), and then checks if the remaining 24,243 bytes of the byte length 902 of ONU#2 can be accommodated in the third period byte length of 19,440 bytes (1308). In this case, the remaining bytes cannot be accommodated. So, the transmission timing determination unit 801 gives all time slots of the third period to ONU#2 and sets the Start value and End value of ONU#2 in the third period to 12 bytes and 19,440 bytes, respectively (1306). At this point in time, the data length of ONU#2 that has yet to be allocated with time slot is 24,243− 19,440+12=4,815 (bytes).

Then, the transmission timing determination unit 801 confirms that the fourth period remains to be processed (1307), and then checks if the remaining 4,815 bytes of the byte length 902 of ONU#2 can be accommodated in the fourth period byte length of 19,440 bytes (1308). In this case, the remaining bytes can be accommodated, so the transmission timing determination unit 801 sets the Start value and End value of ONU#2 in the fourth period to 12 bytes and 8,427 bytes, respectively (1304). The transmission timing determination unit 801 confirms that all ONUs have been allocated with time slots (1305) and ends the time slot allocation processing.

Figure 14:
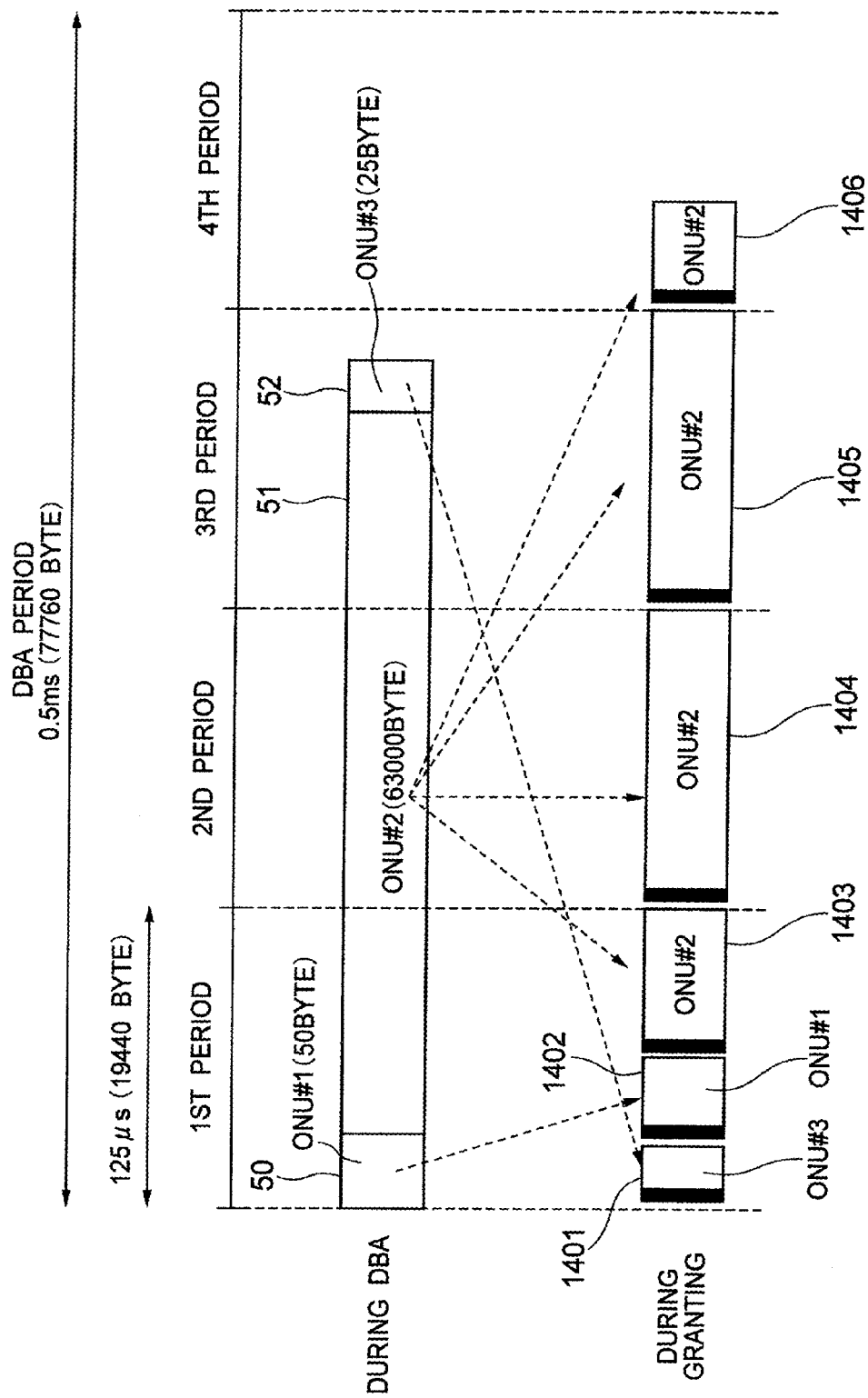
FIG. 14 is a diagram showing how grant frames are arrayed according to embodiment 1.

FIG. 14 shows how the OLT 1 in this embodiment arrays the data transmission timings for ONUs. As in the case of FIG. 5, the DBA processing unit 707 assigns 50 bytes of data 50 to ONU#1, 63,000 bytes of data 51 to ONU#2 and 25 bytes of data 52 to ONU#3. If time slots are allocated according to the procedure of this embodiment, all data of ONU#3 and ONU#1 are accommodated in the first period. So, a small volume of data that the ONUs want transmitted and which is allowed to be transmitted can all be transmitted without being divided. For ONU#2, data extends over the boundary of the grant periods and is divided into four pieces of data. The data volume that can be transmitted therefore decreases by an amount equal to headers attached to the head of each divided data. However, the original data volume of ONU#2 is large enough so that a reduction in the transmitted data volume by the amount of headers has little effect on the data transmission as a whole.

In the above embodiment an example case has been explained in which a time slot is allocated to ONUs beginning with one having the smallest assigned byte length 902. Since this invention is intended to prevent data of small byte length 902 from being located at the boundary between grant periods by checking the magnitude of the byte length 902, it is not necessary to allocate a time slot to ONUs strictly in the ascending order of byte length. For example, a threshold may be provided for the byte length 902. ONUs with their byte length smaller than the threshold are preferentially allocated with time slots, followed by those ONUs with the byte length greater than the threshold. In this case, it is not necessary in each group of ONUs to arrange them strictly in the ascending order of byte length for time slot allocation. For example, if a group of ONUs smaller than the threshold is assigned with time slots within one grant period, there is no problem if the time slot allocation order with respect to the byte length 902 is reversed in that group.

[Embodiment 2]

As another embodiment, a method may be conceived which further reduces the probability of ONU transmission data of small byte length being fragmented, by arranging ONUs in the ascending order of byte length 902 and limiting the number of ONUs that can be allocated within one grant period.

FIG. 15 is a transmission timing table 1500 of this embodiment. In this embodiment, only one ONU is allocated with a time slot in every grant period.

Figure 16:
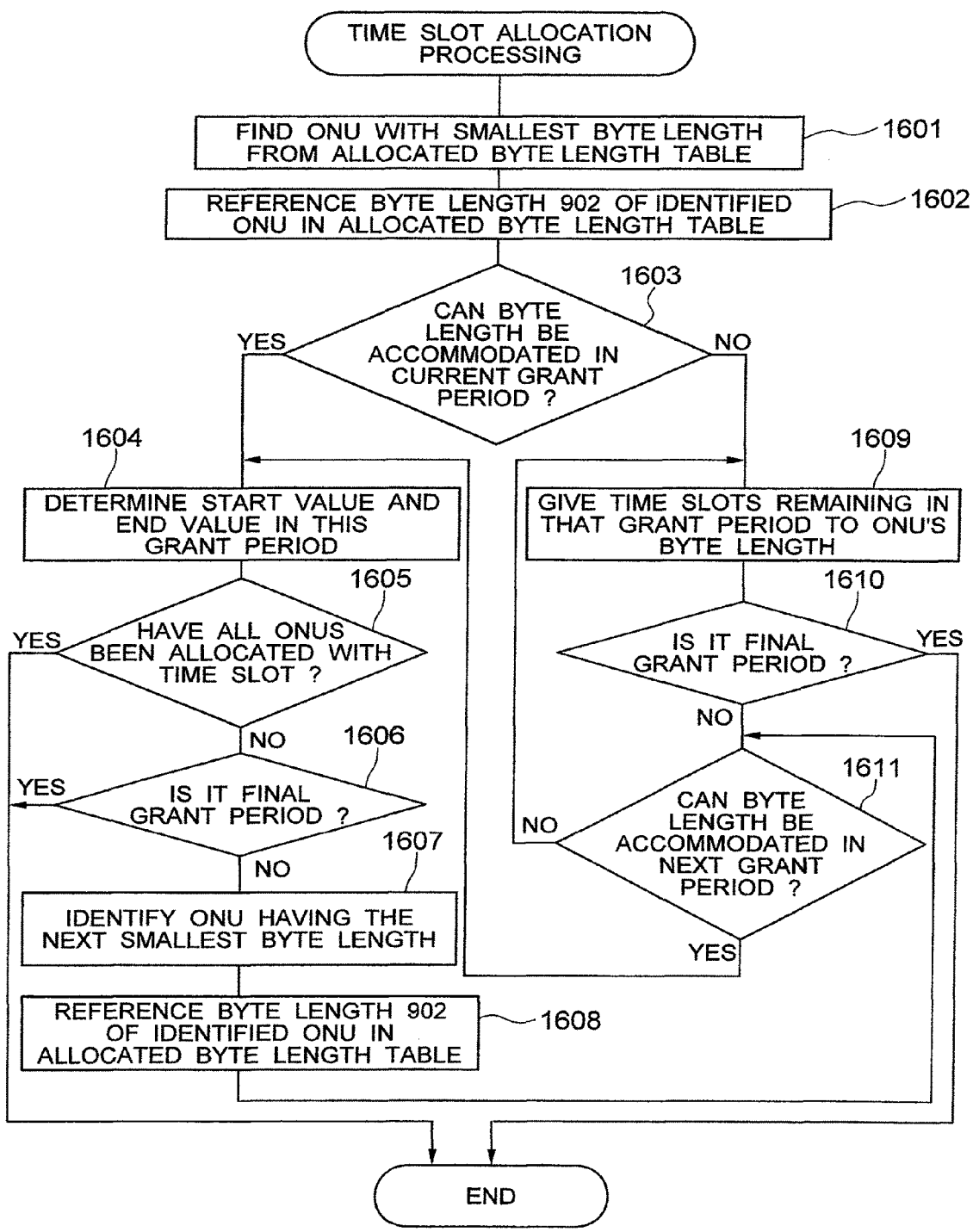
FIG. 16 illustrates an example flow chart showing a sequence of steps executed by time slot allocation processing according to embodiment 2.

FIG. 16 is a flow chart for the time slot allocation processing executed by the transmission timing determination unit 801 when only one ONU is allocated in one grant period. What differs greatly from the flow chart of FIG. 13 is that the processing of step 1306 in the flow chart of FIG. 14 is replaced with steps 1506-1508 in the flow chart of FIG. 15 to renew the grant period each time a new ONU is allocated with a time slot.

An explanation will be given to the process of generating the transmission timing table 1500 of FIG. 15 by applying the flow chart of FIG. 16 to the allocated byte length table 802 of FIG. 9. For ONU#3 with the smallest byte length 902, the processing is the same as that shown in the flow chart of FIG.

13 up to the step (1604) of setting the Start value and End value in the first grant period to 12 bytes and 37 bytes, respectively, and the step (1605) of confirming that ONU#1 and ONU#2 remain to be processed.

Then, the transmission timing determination unit 801 confirms that the second to fourth grant period remain to be processed (1606) and identifies ONU#1 as the ONU having the shortest byte length 902 next to ONU#3 (1607). The transmission timing determination unit 801 refers to the byte length 902 of ONU#1 (1608) and checks if the byte length of 50 bytes can be accommodated in the 19,440-byte length of the next grant period or second period (1611). In this case, the 50 bytes can be accommodated, so the transmission timing determination unit 801 sets the second period Start value of 12 bytes and End value of 62 bytes as the transmission timing for ONU#1 (1604).

Next, the transmission timing determination unit 801 checks that ONU#2 has yet to be allocated with a time slot (1605) and that the third and fourth grant period remain to be processed (1606), and then identifies ONU#2 as the ONU having the shortest byte length 902 next to ONU#1 (1607). The transmission timing determination unit 801 refers to the byte length 902 of ONU#2 (1608) and checks whether its byte length of 63,000 bytes can be accommodated in the third grant period byte length of 19,440 bytes (1611). In this case, the 63,000 bytes cannot be accommodated. So, the transmission timing determination unit 801 sets the Start value of 12 bytes and End value of 19,440 bytes as the ONU#2 transmission timing in the third period (1609). At this point in time, the data length of ONU#2 that has yet to be allocated with a time slot is 63,000−19,440+12=43,572 (bytes).

The transmission timing determination unit 801 confirms that the fourth grant period still remains to be processed (1610) and checks if the remaining 43,572 bytes of ONU#2 can be accommodated in the fourth period byte length of 19,440 bytes (1611). In this case the remaining bytes cannot be accommodated, so the transmission timing determination unit 801 sets the Start value of 12 bytes and End value of 19,440 bytes as the transmission timing in the fourth period for ONU#2 (1609). At this point in time, the data length of ONU#2 that has yet to be allocated with a time slot is 43,572−19,440+12=24,144 (bytes).

Then, the transmission timing determination unit 801 decides that there is no grant period remaining in this DBA period (1610) and ends the time slot allocation processing in this DBA period.

As described above, limiting the number of ONUs that use one grant period causes those ONUs whose byte lengths 902 are small in the allocated byte length table 802 to reliably enter into an early grant period. This further reduces the probability of the data of ONU with a small byte length 902 being fragmented. For ONU#2, this method means that, of the data length of 63,000 bytes that OLT has permitted for use, 24,144 bytes cannot be used. Comparing an effect produced when a part of small size data is lost and an effect produced when a part of large size data is lost, the effect caused by the loss of a part of the small size data is considered more grave. From this viewpoint, the method of this embodiment is effective.

Figure 17:
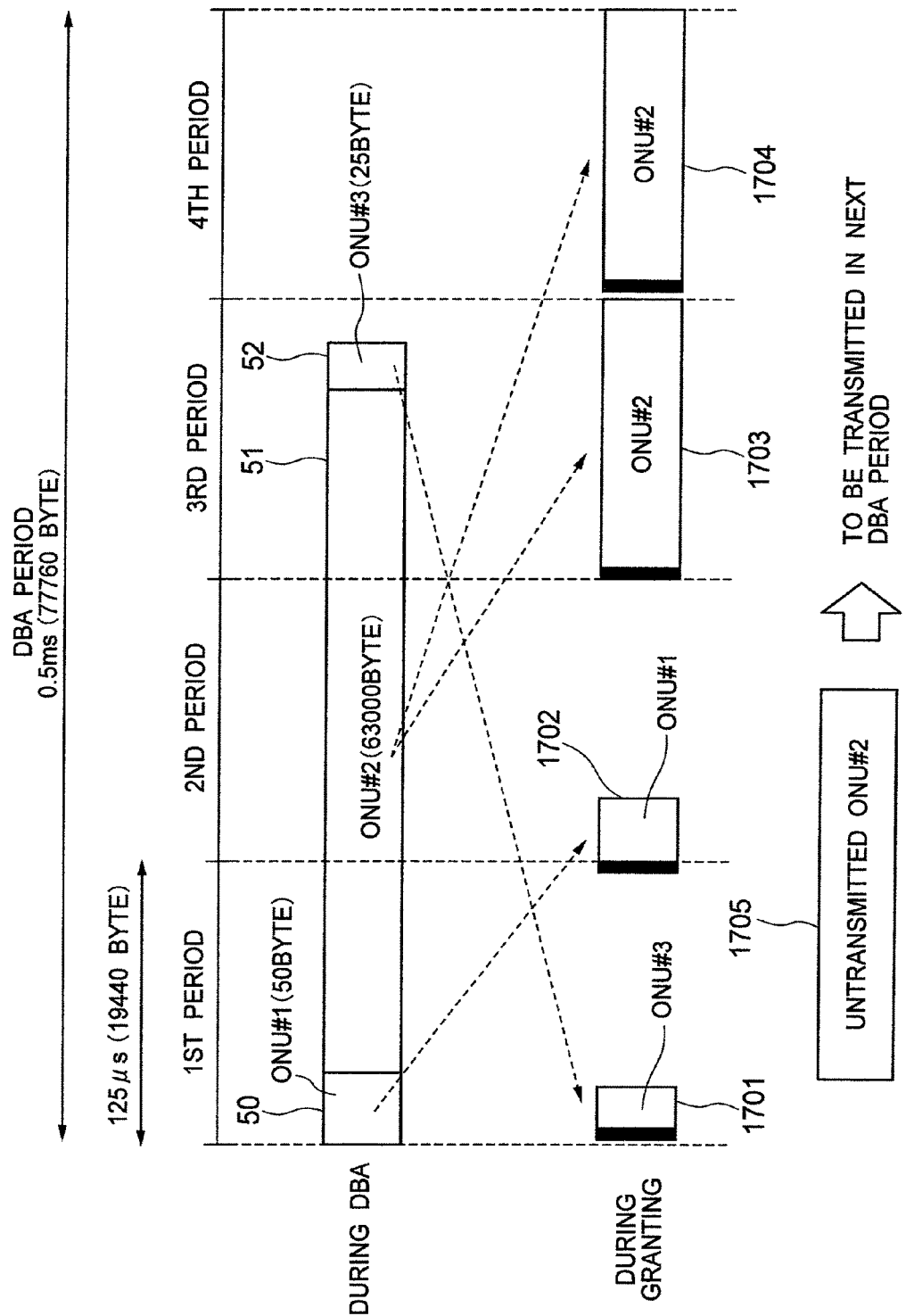
FIG. 17 is a diagram showing how grant frames are arrayed according to embodiment 2.

FIG. 17 shows how the OLT 1 in this embodiment arrays the data transmission timings for ONUs. As in the case of FIG. 5, the DBA processing unit 707 assigns 50 bytes of data 50 to ONU#1, 63,000 bytes of data 51 to ONU#2 and 25 bytes of data 52 to ONU#3. If time slots are allocated according to the procedure of this embodiment, all data of ONU#3 is accommodated in the first period and all data of ONU#1 is accommodated in the second period. So, a small volume of data that these ONUs want transmitted can all be transmitted without being divided.

In the examples shown in FIG. 15, FIG. 16 and FIG. 17, we have explained a case where only one ONU is assigned to one grant period. It is also possible to put an upper limit on the number of ONUs and assign a plurality of ONUs to one grant period.

Now, effects commonly produced by embodiment 1 and embodiment 2 will be explained. Fragmentation occurs when the bandwidth allocation area spreads over a boundary of 125-µs frames. A single 125-µs frame can accommodate several hundred small signals of a bandwidth of about 100 kbits/s. So, such small signals are rarely fragmented. In practice, in data services such as Internet access, because there are only limited cases where upstream data is transmitted, many users spend most of their time transmitting small bandwidth data of about 100 kbits/s such as VoIP signals that occur continuously. Therefore, most of the users are accommodated in one 125-µs frame without being fragmented and normally only a few users are considered to use a bandwidth of several 100 Mbits/s in bursts, causing fragmentations. The embodiment 1 or 2, therefore, can provide communication services capable of satisfying a majority of users. For those users who transmit large size data in bursts, if transmission delays occur with only a part of the large volume of data, the effect produced by such delays is small and does not pose a problem when viewed from the standpoint of the overall communication services they receive.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical line terminal, or carrier side device, connected through optical transmission lines to a plurality of optical network units (ONUs), or subscriber side devices, the optical line terminal comprising:
   an active bandwidth allocation unit to allocate a data amount that it permits each of the ONUs to transmit to the optical line terminal in a predetermined period; and
   a data send permission unit to refer to the data amount that is allocated by the optical line terminal, to allocate a time slot in which data is transmitted to the optical line terminal for each of the ONUs that has the data amount which is smaller than a predetermined value at first then to allocate the time slot to remaining ONUs.

2. An optical line terminal according to claim 1, wherein:
   a grant period in which the data send permission unit permits the plurality of ONUs to transmit is shorter than the predetermined period, and
   the data send permission unit allocates the time slot for the each of the ONUs using a plurality of the grant periods which are included in the predetermined period.

3. An optical line terminal according to claim 2, wherein the data send permission unit allocates time slot in single grant period for the each of the ONUs that has the data amount, determined by the data send permission unit, which is smaller than a predetermined value so that the time slot does not bestride the plurality of the grant periods.

4. An optical line terminal according to claim 2, wherein the data send permission unit allocates time slot which bestrides the plurality of the grant periods for an ONU that has the data amount, determined by the data send permission unit, which is larger than an amount to be transmitted in single grant period.

* * * * *